United States Patent
Nambisan et al.

(10) Patent No.: US 10,673,725 B2
(45) Date of Patent: Jun. 2, 2020

(54) DETERMINING OPERATING STATUSES OF APPLICATIONS IN DIFFERENT DATACENTERS AND SWITCHING ACCESS BETWEEN THE APPLICATIONS

(71) Applicant: HEWLETT PACKARD ENTERPRISE DEVELOPMENT LP, Houston, TX (US)

(72) Inventors: Gopakumar Nambisan, Kochi (IN); Sanjay Hegde, Bangalore (IN); Suchin Somashekar, Bangalore (IN); Krishnamoorthy Joshi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/146,918

(22) Filed: Sep. 28, 2018

(65) Prior Publication Data
US 2020/0106687 A1   Apr. 2, 2020

(51) Int. Cl.
*H04L 12/26* (2006.01)
*H04L 29/06* (2006.01)
*H04L 12/28* (2006.01)
*H04L 12/46* (2006.01)

(52) U.S. Cl.
CPC ......... *H04L 43/10* (2013.01); *H04L 12/2854* (2013.01); *H04L 12/4633* (2013.01); *H04L 12/4641* (2013.01); *H04L 69/164* (2013.01)

(58) Field of Classification Search
CPC .............. H04L 43/10; H04L 12/2854; H04L 12/4633; H04L 12/4641; H04L 69/164
See application file for complete search history.

(56) References Cited

U.S. PATENT DOCUMENTS

| | | | |
|---|---|---|---|
| 8,200,773 B2 * | 6/2012 | Bluestone | G06F 21/53 709/217 |
| 9,059,926 B2 | 6/2015 | Akhter et al. | |
| 2013/0039364 A1 | 2/2013 | Pankratov | |
| 2016/0197834 A1 | 7/2016 | Luft | |
| 2016/0328222 A1 * | 11/2016 | Arumugam | G06F 8/60 |

(Continued)

FOREIGN PATENT DOCUMENTS

CN   104426732 A   3/2015

OTHER PUBLICATIONS

Build a Wiser WAN, http://www.verizonenterprise.com/resources/solutionbriefs/sb_build-a-wiser-wan_en_xg.pdf, pp. 1-3.

(Continued)

*Primary Examiner* — Arvin Eskandarnia
(74) *Attorney, Agent, or Firm* — McDermott Will & Emery

(57) ABSTRACT

A computer-implemented method includes requesting, using a branch controller, an operating status of at least one application of a first plurality of applications executing in a first core site using a first User Datagram Protocol (UDP) ping, the first UDP ping being transmitted to a first network controller included in the first core site through a first VPN connection between the branch controller and the first core site; and receiving, using the branch controller, the operating status of the at least one application of the first plurality of applications using the first UDP ping received through the first VPN connection.

19 Claims, 6 Drawing Sheets

(56) References Cited

U.S. PATENT DOCUMENTS

2018/0149010 A1* 5/2018 Zheng .................... E21B 44/00

OTHER PUBLICATIONS

Cisco Concentrator, https://technet.microsoft.com/en-us/library/cc302438.aspx, pp.

IPv6-in-IPv4 tunnel discovery: methods and experimental results, http://citeseerx.ist.psu.edu/viewdoc/download?doi=10.1.1.125.3537&rep=rep1&type=pdf , dated Apr. 2004, pp. 1-10.

Is it safe not to encrypt ping packets?, https://security.stackexchange.com/questions/40718/is-it-safe-not-to-encrypt-ping-packets, dated May 14, 2015, pp. 1-3.

Managed Device at Branch Office (BOC), https://community.arubanetworks.com/aruba/attachments/aruba/unified-wired-wireless-access/76990/1/Managed%20Devices%20ar/020Branch%20Office.

* cited by examiner

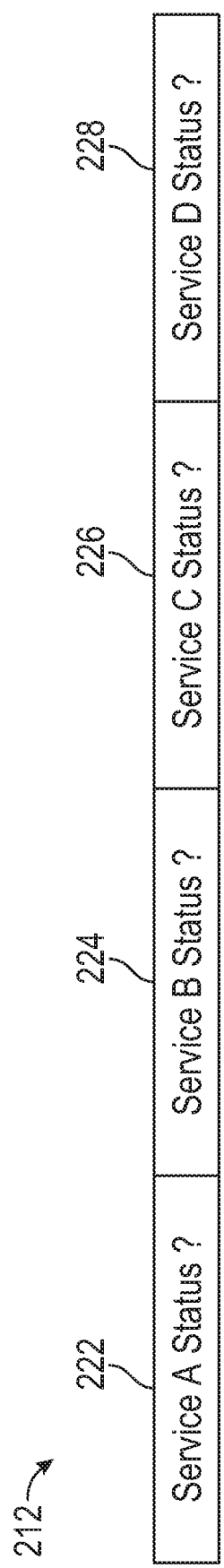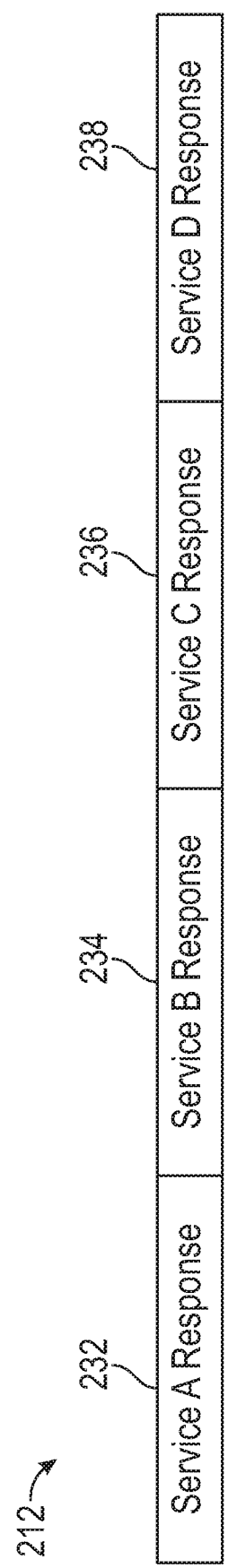

DETERMINING OPERATING STATUSES OF APPLICATIONS IN DIFFERENT DATACENTERS AND SWITCHING ACCESS BETWEEN THE APPLICATIONS

BACKGROUND

In certain enterprise implementations, virtual private networks (VPNs) can be used to connect a branch network to services provided from a core site or another branch site of the wide area network (WAN). Some examples of such services include firewalls, storage as a service, remotely accessible virtual machines, and collaborative tools.

A virtual private network (VPN) is a network connection in which data that transits the VPN is tunneled through some larger network (such as the Internet), as opposed to running across dedicated links to the private network. Commonly, such data is encrypted prior to being transmitted, thus not benefiting from the DNS and routing intelligence of the larger network. One common application of a VPN is to secure communications (such as confidential information used by employees when working at a branch office or remotely for a company) through a public network.

Virtual Private Networks (VPNs) are being increasingly deployed, over the existing Internet infrastructure, in support of B2B, supply chain logistics, and as a networking cost-reduction for an enterprise when communicating to its own branch offices. Alternative solutions, such as multi-protocol label switching (MPLS), are often too costly, resulting in the increasing deployment of VPNs to communicatively couple branch offices to core sites of a WAN. Typically, a business will organize its VPNs for a site or geographic area to connect to a single VPN gateway (also referred to as a VPN concentrator). Each gateway may support many independent VPN connections from many remote systems, or remote gateways to smaller branch office networks, or suppliers (for example). In many examples, the term "VPN connection" refers to an "IP Sec tunnel", defined in IETF RFC2401. These connections may be controlled using a paradigm called software defined wide area network (SD-WAN). SD-WAN often uses a branch gateway on the branch network to communicate via one or more VPN connections through one or more internet service provider (ISP) modems to one or more VPN concentrators (VPNCs) at one or more core sites.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 2B illustrates contents of an example payload data of the UDP pings in FIG. 1 when requesting the status of the services/applications in the corresponding datacenters in FIG. 1, according to example embodiments.

FIG. 2C illustrates contents of an example payload data of the responses for UDP pings in FIG. 1 transmitted by the Virtual Private Network controllers (VPNCs) in FIG. 1 when providing the status of the applications in the corresponding datacenters in FIG. 1, according to example embodiments.

DETAILED DESCRIPTION

Figure 1:
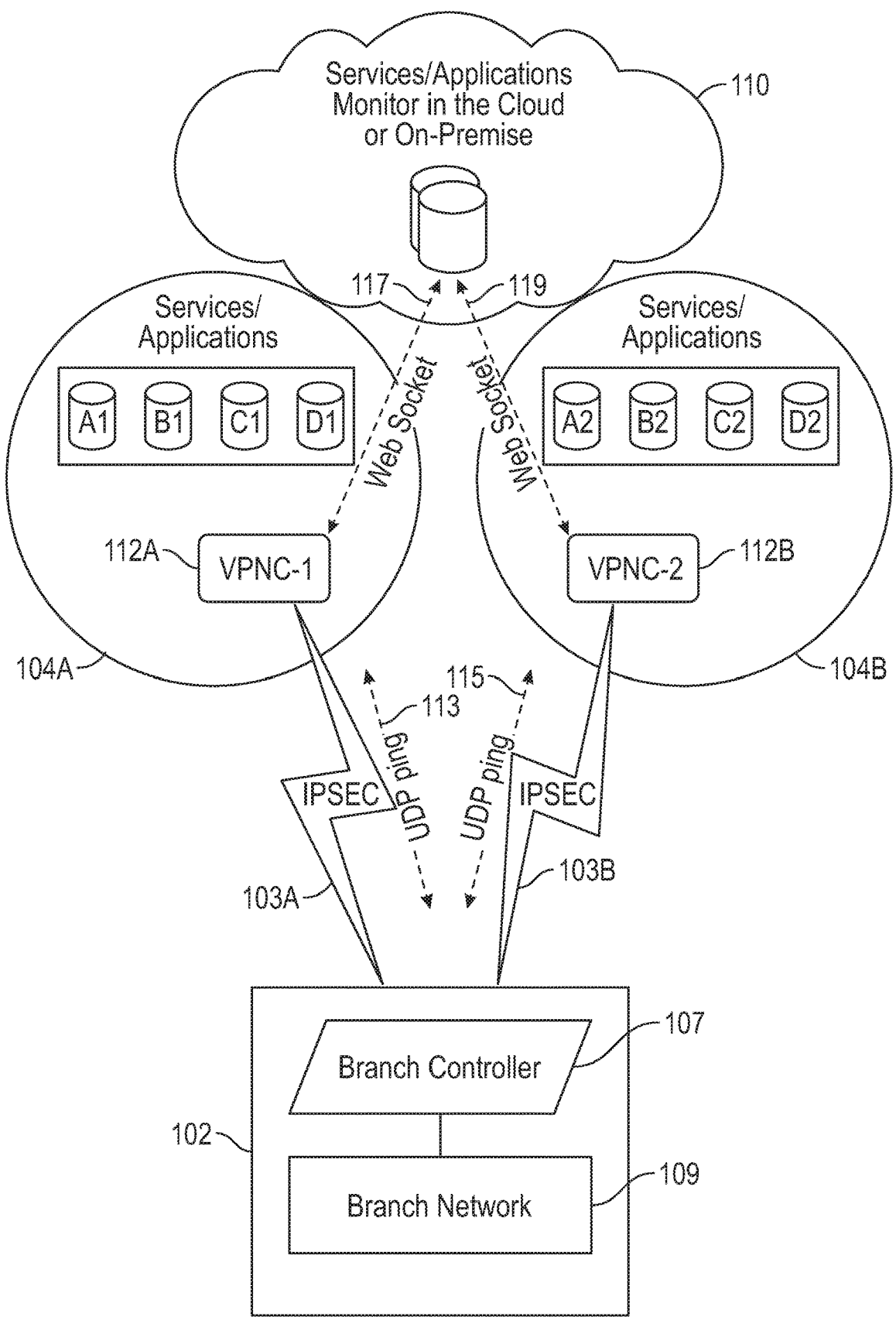
FIG. 1 is a schematic diagram of an example network that may employ principles of the present disclosure, according to one or more embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Often, when VPN connections are implemented in an SD-WAN context, multiple redundant VPN connections are established between the branch site and the core site. VPN connections may also be established to multiple core sites across the WAN for further redundancy and to access additional network services. Note: although "branch site" and "core site" are used in this disclosure as the endpoints of the VPN connections, this disclosure contemplates the VPN connections having any appropriate endpoints. These redundant VPN connections reduce the risk of network failure due to a hardware or link failure along one ISP's network path. They also reduce the number of single points of failure across the WAN.

Commonly, these VPN connections are configured in an "active-standby" mode, where one or more VPN connection is actively transceiving data, and one or more VPN connection is idle standing by, waiting for a failover condition if one or more of the active VPN connections fails. Alternatively, these VPN connections can be configured in an "active-active" mode where all of the VPN connections are actively transceiving data at once.

In an "active-active" branch network, the branch gateway must decide which VPN connection to forward data through. Various load balancing algorithms may apply in order to effectively use all of the VPN connections efficiently. Similarly, the branch gateway must decide which core site to forward data to in the case where multiple core sites support the applications and services relevant to the forwarded data.

For example, as described in this disclosure, the branch gateway may transmit a probe packet to a connected VPNC in a core site to gather information about network characteristics across the VPN connections. Typically, the network characteristics like latency, jitter, round-trip time (RTT), reachability, and the like, may be determined a User Datagram Protocol (UDP) based request/response mechanism. For purposes of discussion herein, this UDP based request/response mechanism is referred to as a UDP ping. For instance, in a WAN, a branch site may be connected to two (or more) core site (e.g., multiple datacenters) via a VPN connection (e.g., a IPsec tunnel) established with each of the core sites. The UDP ping may be used in this case to determine the network characteristics between the branch site and core sites. Each core site provides applications/services (e.g., billing software, inventory software) that client devices on the branch site access. Once a connection is established between a client device on the branch site and a service provider on a core site, the branch site connection will be anchored on one of the VPN connections core site for continued access to the related applications/services (this is often called a "sticky client"). In some examples, the client itself is anchored to the VPN connection. In some other examples, the specific connection is anchored to the VPN connection. In yet other examples, all connections related to the relevant applications/services for the branch site are anchored to the VPN connection. As would be clear to a person skilled in the art, this disclosure contemplates the scope of such anchoring being any appropriate scope. At some point, depending on the measured network characteristics, it may be determined that the VPN connection to core site current service provider is not performing as desired. The network traffic between the branch site client device and core site current service provider may then be switched over to core site a different service provider, and the branch site client device will access the necessary applications/services from the core site different service provider. In some examples, the branch gateway periodically re-evaluates whether the client device should be switched over to the different service provider.

In some examples, the UDP ping is transmitted from "outside" the IPsec tunnel between the source and core sites. Since the UDP ping is not transmitted inside the IPsec tunnel, the UDP ping may not be encrypted. Secondly, a UDP ping sent outside the IPsec tunnel is limited in its ability to gather information about the operation of the IPsec tunnel. In many examples, a UDP ping sent outside the IPsec tunnel may only be used to determine the network characteristics for providing an indication of the "health" of the network (e.g. is the core site still running?). While the "health" of the network may be determined, the operating status of the applications/services in executing in the core sites cannot be determined.

Embodiments disclosed configure a UDP ping for providing network characteristics information to a branch site controller (e.g. branch gateway) branch site from a core site VPNC. As a result, the branch site controller can obtain information regarding the operating status of the applications/services provided by the core site. Depending on the operating status, the branch site controller can switch branch site client devices over to another core site to access the relevant applications/services as provided by the other core site.

Embodiments disclosed address a technical problem tied to computer technology and arising in the realm of computer networks, namely the lack of programmability of SD-WAN for configuring the network based on the health and availability of applications operating on the network. Examples described in this disclosure improve the operation of a WAN by altering the routing of packets based on regularly updated information about the performance and characteristics of the network, including the performance and characteristics of the network in relation to specific applications and services. This improvement may result in reduced downtime during an outage, improved application performance as viewed from the client device, and improved network utilization.

It is desirable to program the SD-WAN based on the health and availability of applications executing on the network (e.g., on a server in a core site). For instance, it is desirable to program the network for rerouting traffic to another core site's application instance in case of increased latency for accessing an application or in the case of failure of an application on the original core site.

Example System Architecture

FIG. 1 is a schematic diagram of an example network 100 that may employ principles of the present disclosure, according to one or more embodiments. In an example, for the sake of discussion herein, network 100 is a Wide Area Network (WAN) of an organization. However, network 100 is not limited in this regard and may include other types of networks.

As illustrated, network 100 includes a branch site 102 and at least two core sites 104A and 104B (collectively, core sites 104) connected via respective VPN connections (IPsec tunnels) 103A and 103B (collectively, VPN connections 103). However, the number of core sites 104 and VPN connections 103 is not limited in this regard, and embodiments disclosed are equally applicable to a network that includes more than two core sites 104, and a corresponding number of VPN connections 103 (including multiple VPN connections 103 per core site 104).

In an example, the branch site 102 may be or include a branch office of the organization, which may include client devices, such as employee laptops, cell phones, computers, network infrastructure, Internet of Things device, and any other appropriate client devices. The core sites 104A, 104B may be or include a datacenter (DC) of the organization, each of which includes applications (or services) that the branch site 102 accesses through the VPN connections 103. The connections 103A, 103B may be through a wired connection (e.g., a copper cable, a fiber optic cable), a wireless connection (e.g., Wi-Fi, cellular network, and the like), or a combination thereof. Each VPN connection 103 may pass through the Internet using an ISP connection. For example, the services/applications may include billing or inventory applications which are designed or otherwise configured for use by the organization and which the branch offices access.

The branch site 102 has at least one VPN connection 103 with each core site 104. In an example configuration of the network 100, the branch site 102 primarily communicates with one of the core sites 104, e.g., core site 104A, to access the services/applications provided by core site 104A. As discussed below, the branch site 102 switches over to the core site 104B when the service/applications provided by the core site 104A fail or are otherwise unavailable.

In an example, the network 100 may be a WAN of an organization that includes a restaurant chain. The restaurant chain may operate multiple restaurant locations 102 and two datacenters 104, each at geographically different locations. The datacenters 104 each provide a billing application which each restaurant location 102 utilizes. Each restaurant location 102 has a connection with each datacenter 104, and primarily communicates with one of the datacenters.

For the purposes of discussion, the branch site 102 is considered to include a branch office and the core sites 104A, and 104B are considered to include datacenters, and accordingly, embodiments are described herein with reference to a branch office 102 and datacenters 104A and 104B.

The branch office 102 includes a branch gateway or branch controller 107, which connects an internal branch network 109 (e.g., internet access from a local service provider) to the VPN connections 103A and 103B. In an example, the branch controller 107 may be a broadband router, a SDN branch gateway (router), or the like.

The datacenter 104A may house computer systems and associated components, such as telecommunications and storage systems, that provide the necessary platform for executing a variety of applications (or services) A1, B1, C1, D1 that are accessed by the branch office 102 via a VPN controller (or VPN concentrator) (VPNC) 112A in the datacenter 104A. In an example, the applications A1, B1, C1, D1 may be implemented by one or more computing devices or systems in some embodiments, such as a computing system 500 described in FIG. 5. In an example, the VPNC 112A may be a high capacity network controller or the like.

The VPNC 112A is programmed to obtain the operating condition (operational or non-operational (failed)), operating capacity (operating below capacity, at capacity, or above capacity), operating performances (operating performance is below a critical value, at a critical value, or above a critical value), operational efficacy, and the like (collectively referred to herein as the 'operating status') of one or more applications A1, B1, C1, D1. In an example, and as illustrated, the VPNC 112A is programmed to communicate (e.g., using connection 117) with an application monitor 110 to obtain the operating statuses of the applications A1, B1, C1, D1. In an example, the VPNC 112A may communicate using WebSocket or similar communication protocols.

In an example, the application monitor 110 ensures that the applications A1, B1, C1, D1 perform in an expected manner and scope. The application monitor 110 identifies, measures and evaluates the performance of an application and provides the means to isolate and rectify any abnormalities or shortcomings. In an example, the application monitor 110 may be or include application performance monitoring software that is implemented by one or more computing devices or systems in some embodiments, such as a computing system 500 described in FIG. 5. The application monitor 110 may be cloud based or may be located in the datacenter 104A. The application monitor 110 may determine the operating statuses of the applications A1, B1, C1, D1 at regular intervals (e.g., every 5 minutes, 10 minutes, etc.) or at a user desired intervals. The application monitor 110 may store the operating statuses of the applications A1, B1, C1, D1 in a memory location (e.g., in a database) accessible by the application monitor for later retrieval when requested by the VPNC 112A.

The application monitor 110 provides the operating status upon request by the VPNC 112A. The VPNC 112A may request the operating status of one or more of the applications A1, B1, C1, D1 at regular intervals (e.g., every 5 minutes, 10 minutes, etc.) or at a user desired intervals.

The datacenter 104B may also house computer systems and associated components, such as telecommunications and storage systems, that provide the necessary platform for executing applications (or services) A2, B2, C2, D2 that are accessed by the branch office 102 via a VPN controller (VPNC) 112B in the datacenter 104B. In an example, the applications A2, B2, C2, D2 may be implemented by one or more computing devices or systems in some embodiments, such as a computing system 500 described in FIG. 5. In an example, the VPNC 112B may be a high capacity network controller or the like. The applications A2, B2, C2, D2 may be similar to (duplicates) applications A1, B1, C1, D1, respectively, in the datacenter 104A. As discussed below, the branch office 102 accesses one or more of the applications A2, B2, C2, D2 in case of failure or unsuitable operation or unsuitable condition of one or more corresponding applications A1, B1, C1, D1. The application monitor 110 also ensures that the applications A2, B2, C2, D2 perform in an expected manner and scope, as discussed above with reference to applications A1, B1, C1, D1. The VPNC 112B is also programmed to communicate (e.g., using connection 119) with the application monitor 110 to obtain the operating statuses of the applications A2, B2, C2, D2. In an example, the VPNC 112B may communicate using WebSocket or similar communication protocols.

The application monitor 110 may evaluate the operating statuses of the applications A2, B2, C2, D2 at regular intervals (e.g., every 5 minutes, 10 minutes, etc.) or at a user desired intervals. The application monitor 110 may store the operating statuses of the applications A2, B2, C2, D2 in a memory location (e.g., in a database) accessible by the application monitor for later retrieval when requested by the VPNC 112B.

In an example configuration of the network 100, the branch office 102 primarily communicates with the datacenter 104A to access one or more of the applications A1, B1, C1, D1. In order for the branch office 102 to determine the operating statuses of one or more applications A1, B1, C1, D1, the branch office 102 (or more specifically, the branch controller 107) transmits UDP ping 113 to the VPNC 112A in the datacenter 104A. The UDP ping 113 is transmitted through the VPN connection 103A (e.g., transmitted inside the IPsec tunnel) and is thus encrypted. The UDP ping 113 includes fields in the data portion for requesting the operating status of one or more applications A1, B1, C1, D1. In an example, each application A1, B1, C1, D1 may be identified with a unique identifier (ID), and the branch controller 107 can selectively request the operating status of a desired application from the applications A1, B1, C1, D1 using the unique ID. In contrast, the UDP ping in the prior art does not include such fields for requesting the operating status and is not transmitted through the VPN connection 103. Stated otherwise, the prior art UDP ping is transmitted outside the IPsec tunnel. The UDP ping 113 of this disclosure is transmitted at regular intervals (e.g., every 5 minutes, 10 minutes, etc.), at a user desired interval, or upon a network or data condition being met (e.g. UDP ping is sent periodically only when less than 25% of VPN connection bandwidth is being used).

Similarly, the branch controller 107 also transmits a UDP ping 115 to request the operating statuses of one or more applications A2, B2, C2, D2 in the datacenter 104B. The UDP ping 115 is transmitted through the VPN connection 103B and also includes fields in its data portion for requesting the operating statuses of one or more applications A2, B2, C2, D2, each of which may be identified with a unique identifier (ID). Thus, the branch controller 107 can selectively request the operating status of a desired application from the applications A2, B2, C2, D2 using the unique ID. The UDP ping 115 is transmitted at regular intervals (e.g., every 5 minutes, 10 minutes, etc.) or at user desired intervals.

When the VPNC 112A receives the UDP ping 113, the VPNC 112A "reads" the data portion of the UDP ping 113 to determine the application(s) A1, B1, C1, D1 of which the status has been requested by the branch controller 107. The VPNC 112A then provides the status of the requested application(s) A1, B1, C1, D1 to the branch controller 107. For instance, the VPNC 112A may look up the status stored in the database and provide it to the branch controller 107.

If the obtained status indicates that one or more of the applications A1, B1, C1, D1 has an undesirable operating status, the branch controller 107 may switch to the datacenter 104B to access one or more applications A2, B2, C2, D2.

As disclosed above, the applications A1, B1, C1, D1 and applications A2, B2, C2, D2 are duplicates of each other. Accordingly, the branch controller 107 can selectively access an application A2, B2, C2, D2 corresponding to the application having the undesirable application status. For instance, if application A1 is determined to have an undesirable application status, the branch controller 107 can access only the application A2 from the datacenter 104B, and continue to access the applications B1, C1, D1 from the datacenter 104A. However, in some other embodiments, based on user requirements, design requirements, etc., the branch controller 107 may stop accessing all applications A1, B1, C1, D1 and access the applications A2, B2, C2, D2. In some examples, an undesirable operating status includes when the operating status of the relevant application A1-D1 is less desirable than the equivalent application A2-D2 on another datacenter 104.

In an example, once the application A1, B1, C1, D1 having the undesirable operating status has been restored, the branch controller 107 may switch back to the datacenter 104A. As a result, an interrupted, high quality service can be accessed by the branch office 102, and downtime is minimized.

In addition to determining the operating status of applications A1, B1, C1, D1 and applications A2, B2, C2, D2, the corresponding UDP pings 113 and 115 can also determine the operating status of the VPN corresponding connections 103A and 103B. For instance, the operating status of the VPN connections 103 may be determined based on one or more network characteristics including, but not limited to, latency of the connection, jitter, round-trip time (RTT), throughput, reachability, responsiveness, and the like. Thus, the VPN connection 103 having a network characteristic below a desired threshold value may be determined to have an undesirable operating status. The branch controller 107 may then switch over to the VPN connection 103 having a desirable operating status.

In some embodiments, the branch controller 107 may switch over to a different datacenter for load sharing purposes. In such instances, if the branch controller 107 determines that an application in datacenter 104A is operating at or near its operational capacity (e.g., full load condition), while a corresponding application in datacenter 104B has available operational capacity (e.g., low load condition), then the branch controller 107 may switch over access to the application in the datacenter 104B. Thus, it is understood that switching from a first application in a first datacenter to a second application in another datacenter may be performed even if the first application has not failed (is non-operational).

In some embodiments, the branch controller 107 may switch over to a different datacenter if an application cannot provide a desired result due to issues external to the network 100. For instance, datacenter 104A includes an IP telephony server running application A1 and all phones in the organization are connected to this IP telephony server. The datacenter 104B includes another IP telephony server running application A2 which is a duplicate of application A1. Consider a situation where the IP telephony server running application A1 cannot connect to a desired location (e.g., main warehouse of the organization) due to network routing issues external to the network 100, and the IP telephony server running application A2 can connect to the desired location. This lack of connectivity will be determined by the application monitor 110 and conveyed to the VPNC 112A. Thus, upon request, the branch controller 107 will be made aware of this connectivity issue and switch over to IP telephony server running application A2. Thus, although the application A1 may have a desirable operating status, due to factors external to the network 100, the application A1 cannot perform the required task (e.g., provide phone service), and this will require the branch controller 107 to switch applications (and datacenters).

In some embodiments, in case that the branch controller 107 is currently using application A1 in datacenter 104A, and both application A1 and the corresponding application A2 in datacenter 104B have an undesired operating status, then the branch controller 107 will continue using application A1. It should be noted that the branch controller 107 will not disconnect from both datacenters 104A and 104B. Alternatively, the branch controller 107 will use the datacenter 104 having a VPN connection 103 with a relatively lower latency (or other desirable network characteristic).

Figure 2A:
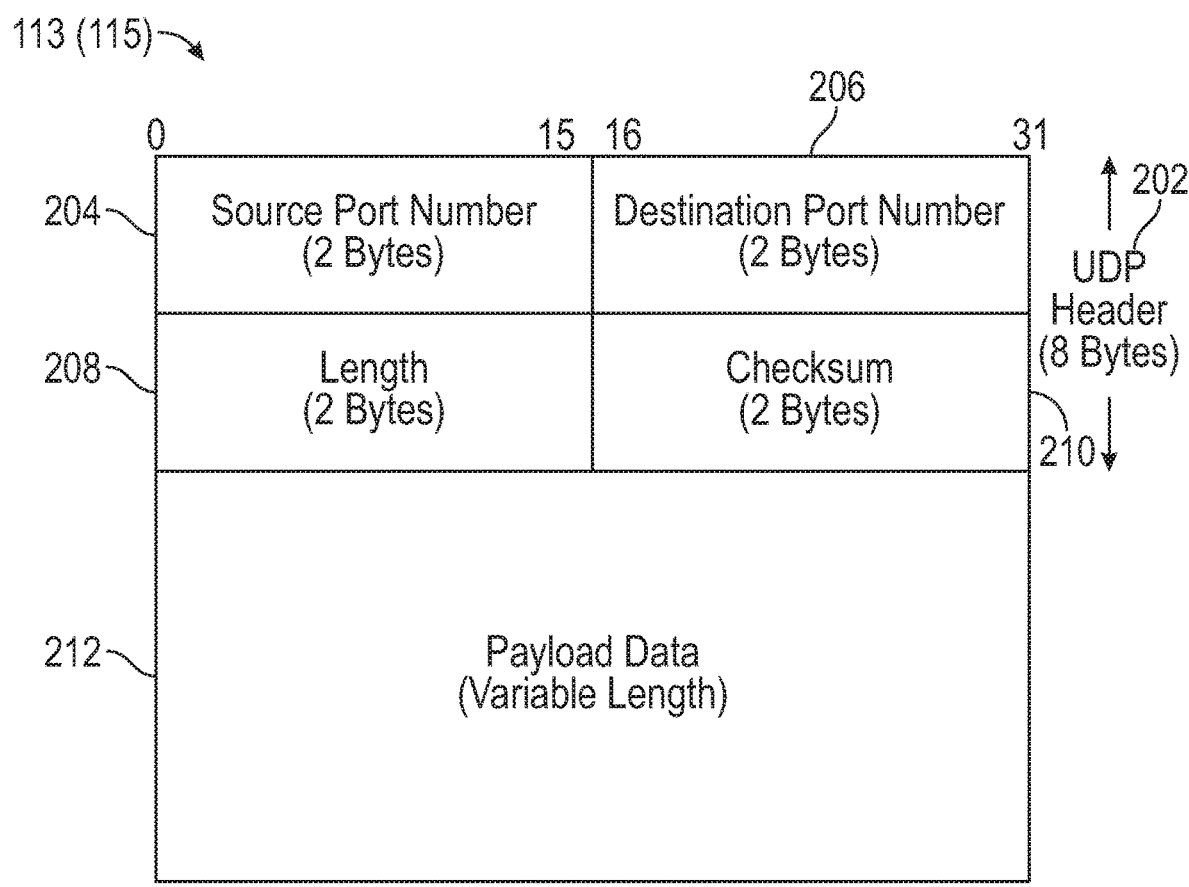
FIG. 2A illustrates contents of a User Datagram Protocol (UDP) pings in FIG. 1, according to example embodiments.

FIG. 2A illustrates contents of a UDP ping 113, according to example embodiments. The UDP ping 115 may have a similar structure. As illustrated, the UDP ping 113 include a UDP header 202 and a Payload data 212. The UDP header 202 includes a Source Port field 204, a Destination Port field 206, a UDP length field 208, and a UDP Checksum field 210. Each field 204, 206, 208, and 210 is 2 bytes in length. The Payload field 212 has a user desired length. The Source Port field 204 is used by UDP packets from a client (sender) as a service access point (SAP) to indicate the session on the local client that originated the packet. UDP packets from a server carry the server SAP in the Source Port field 204. The Destination Port field 206 is used by UDP packets from a client (sender) as a service access point (SAP) to indicate the service required from the remote server (destination). UDP packets from a server carry the client SAP in the Destination Port field 206. The UDP length field 208 indicates the number of bytes comprising the combined UDP header 202 and payload data 212. The UDP Checksum field 210 includes a checksum to verify that the end to end data has not been corrupted by routers or bridges in the network or by the processing in an end system.

FIG. 2B illustrates contents of an example payload data 212 of the UDP ping 113 (and 115) when requesting the status of the services/applications in the corresponding datacenters 104A (104B), according to embodiments disclosed. As illustrated, the payload data 212 includes application status requests in SERVICE STATUS A field 222, SERVICE STATUS B field 224, SERVICE STATUS C field 226, and SERVICE STATUS D field 228, each field requesting a status of a corresponding application in the respective datacenters 104A (104B).

FIG. 2C illustrates contents of an example payload data 212 of the responses for UDP ping 113 (115) transmitted by the VPNC 112A (112B) when providing the status of the applications in the corresponding datacenter 104A (104B), according to embodiments disclosed. As illustrated, the payload data 212 includes application status responses in SERVICE A RESPONSE field 232, SERVICE B RESPONSE field 234, SERVICE C RESPONSE field 236, and SERVICE D RESPONSE field 238. Depending on the operating status of the applications, the fields 232, 234, 236, and 238 may include either a PASS indication or a FAIL indication. The PASS indication represents a desirable operating status of a corresponding application and the FAIL indication represents an undesirable operation of a corresponding application. For instance, if applications A1, B1, and D1 in the datacenter 104A (A2, B2, and D2 in the datacenter 104B) have a desired operating status and the application C1 in the datacenter 104A (C2 in datacenter 104B) has an undesirable operating status, the fields 232, 234, and 238 would indicate PASS, while the field 236 would indicate FAIL.

From the discussion above, it will be apparent that transmitting the UDP ping through the VPN connection 103 provides numerous advantages over the prior art. For instance, the UDP ping is transmitted securely (encrypted) and the application information in the payload field can be protected. Secondly, since the UDP ping is encrypted for transmission, the VPNC 112 has to decrypt the UDP ping upon receipt and encrypt the UDP response for transmission to the branch controller 107. From the delay in the UDP responses received by the branch controller 107, it can be determined whether the encryption (decryption) algorithm at the VPNC 112 is performing as desired. Also, since the UDP ping and the UDP response are sent through the VPN connection 103, they are affected by the performance characteristics of the VPN connection 103, which may be measured by the VPNC 112, the branch controller 107, or both.

Figure 3:
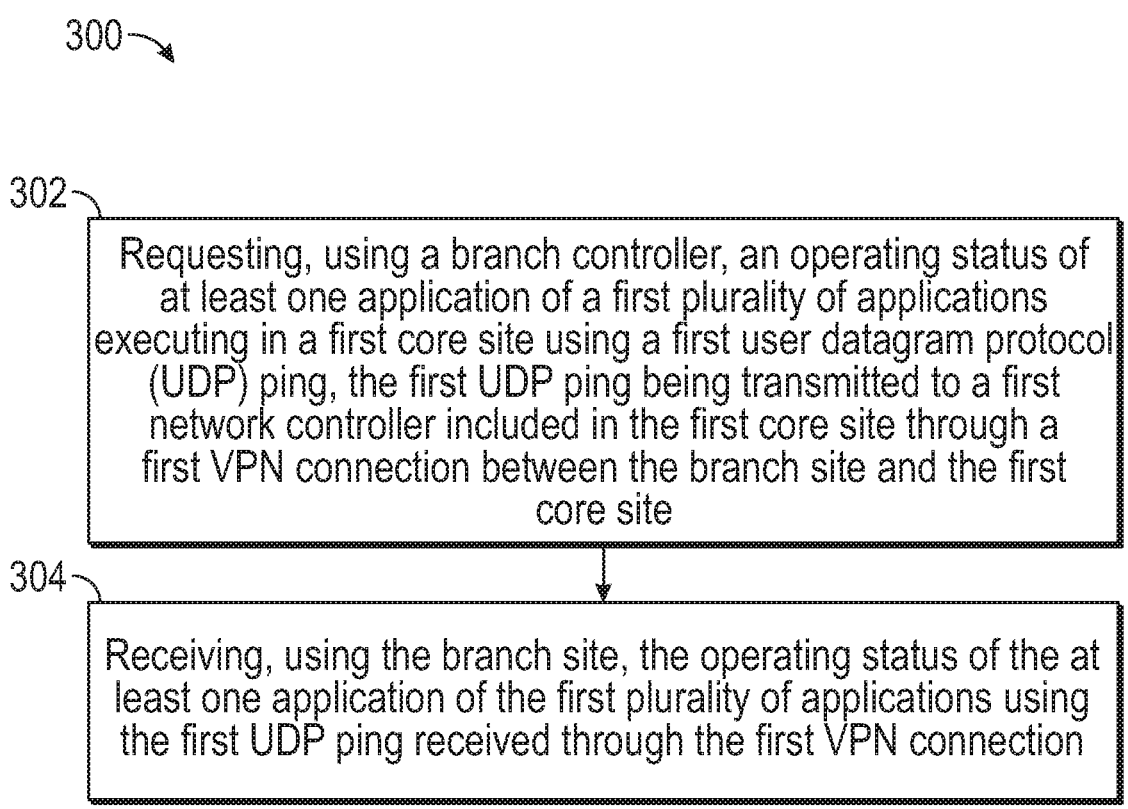
FIG. 3 is a flow chart illustrating steps in a method for determining whether to switch access from an application in a first core site to an application in a second core site, according to example embodiments.

FIG. 3 is a flow chart illustrating steps in a method 300 for determining whether to switch access from an application in a first core site to an application in a second core site, according to example embodiments.

The method 300 may be performed at least partially by the branch controller 107 of the branch site 102. At least some of the steps in method 300 may be performed by the branch controller 107 having a processor executing commands stored in a memory of the branch controller 107. Further, steps as disclosed in method 300 may include retrieving, editing, and/or storing files in a database that is part of, or is communicably coupled to, the branch controller 107. The database may include any one of a configuration and state database, and a time series database. Methods consistent with the present disclosure may include at least some, but not all, of the steps illustrated in method 300, performed in a different sequence. Furthermore, methods consistent with the present disclosure may include at least two or more steps as in method 300 performed overlapping in time, or almost simultaneously.

The method 300 includes requesting, using a branch controller, an operating status of at least one application of a first plurality of applications executing in a first core site using a first User Datagram Protocol (UDP) ping, the first UDP ping being transmitted to a first network controller included in the first core site through a first VPN connection between the branch controller and the first core site, at 302. The method 300 then includes receiving, using the branch controller, the operating status of the at least one application of the first plurality of applications using the first UDP ping received through the first VPN connection, at 304.

Figure 4:
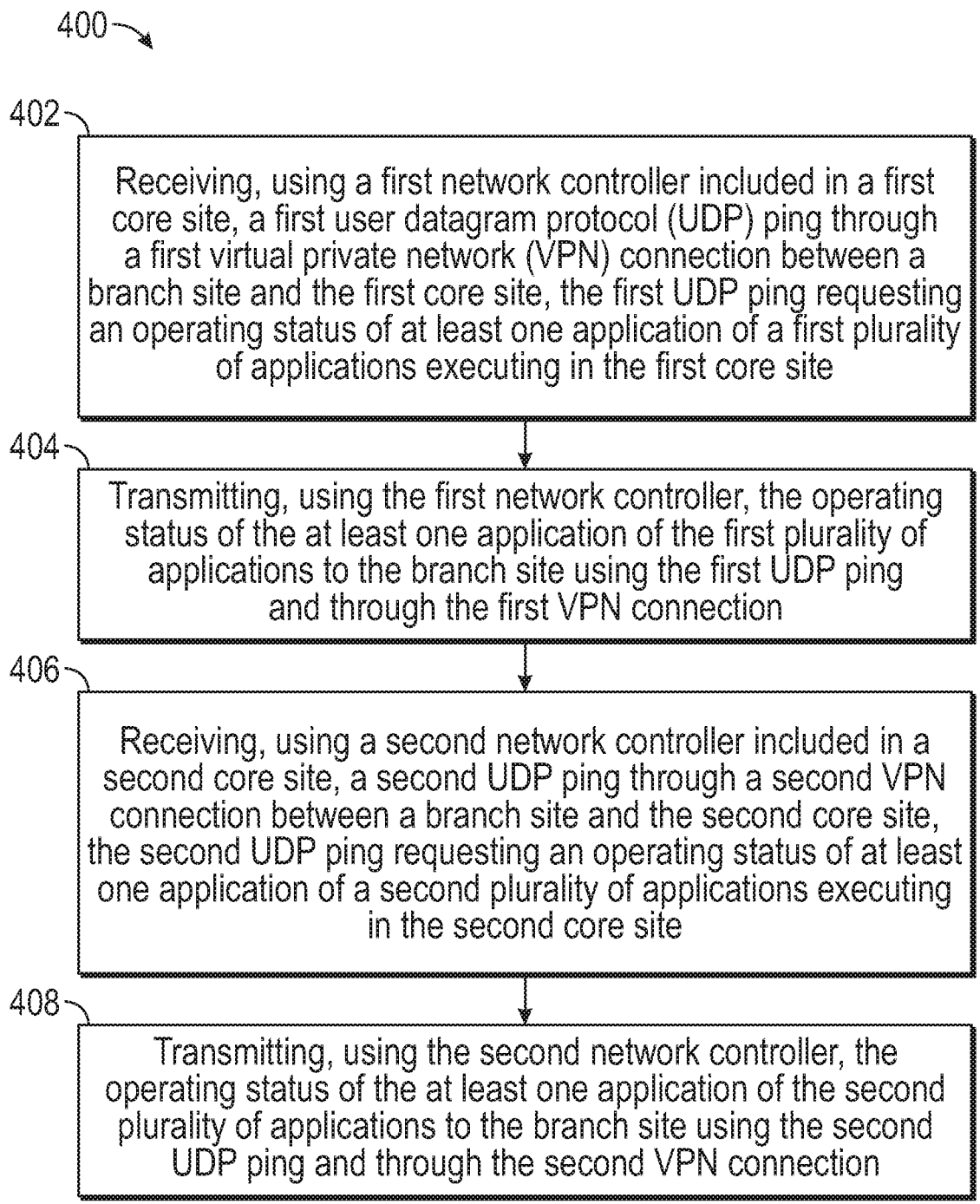
FIG. 4 is a flow chart illustrating steps in a method for obtaining the operating statuses of the applications in the first core site and the second core site, according to example embodiments.

FIG. 4 is a flow chart illustrating steps in a method 400 for obtaining the operating statuses of the applications in the first core site and the second core site, according to example embodiments.

The method 400 may be performed at least partially by the VPNC 112A and/or VPNC 112B of the datacenters 104A and 104B, respectively. At least some of the steps in method 400 may be performed by the VPNC 112A and/or VPNC 112B each having a processor executing commands stored in a memory thereof. Further, steps as disclosed in method 400 may include retrieving, editing, and/or storing files in a database that is part of, or is communicably coupled to, the VPNC 112A and/or VPNC 112B. The database may include any one of a configuration and state database, and a time series database. Methods consistent with the present disclosure may include at least some, but not all, of the steps illustrated in method 400, performed in a different sequence. Furthermore, methods consistent with the present disclosure may include at least two or more steps as in method 400 performed overlapping in time, or almost simultaneously.

The method 400 includes receiving, using a first network controller included in a first core site, a first User Datagram Protocol (UDP) ping through a first Virtual Private Network (VPN) connection between a branch site and the first core site, the first UDP ping requesting an operating status of at least one application of a first plurality of applications executing in the first core site, at 402, and transmitting, using the first network controller, the operating status of the at least one application of the first plurality of applications to the branch site using the first UDP ping and through the first VPN connection, at 404. The method 400 further includes receiving, using a second network controller included in a second core site, a second UDP ping through a second VPN connection between a branch site and the second core site, the second UDP ping requesting an operating status of at least one application of a second plurality of applications executing in the second core site, at 406, and transmitting, using the second network controller, the operating status of the at least one application of the second plurality of applications to the branch site using the second UDP ping and through the second VPN connection, at 408.

Hardware Overview

Figure 5:
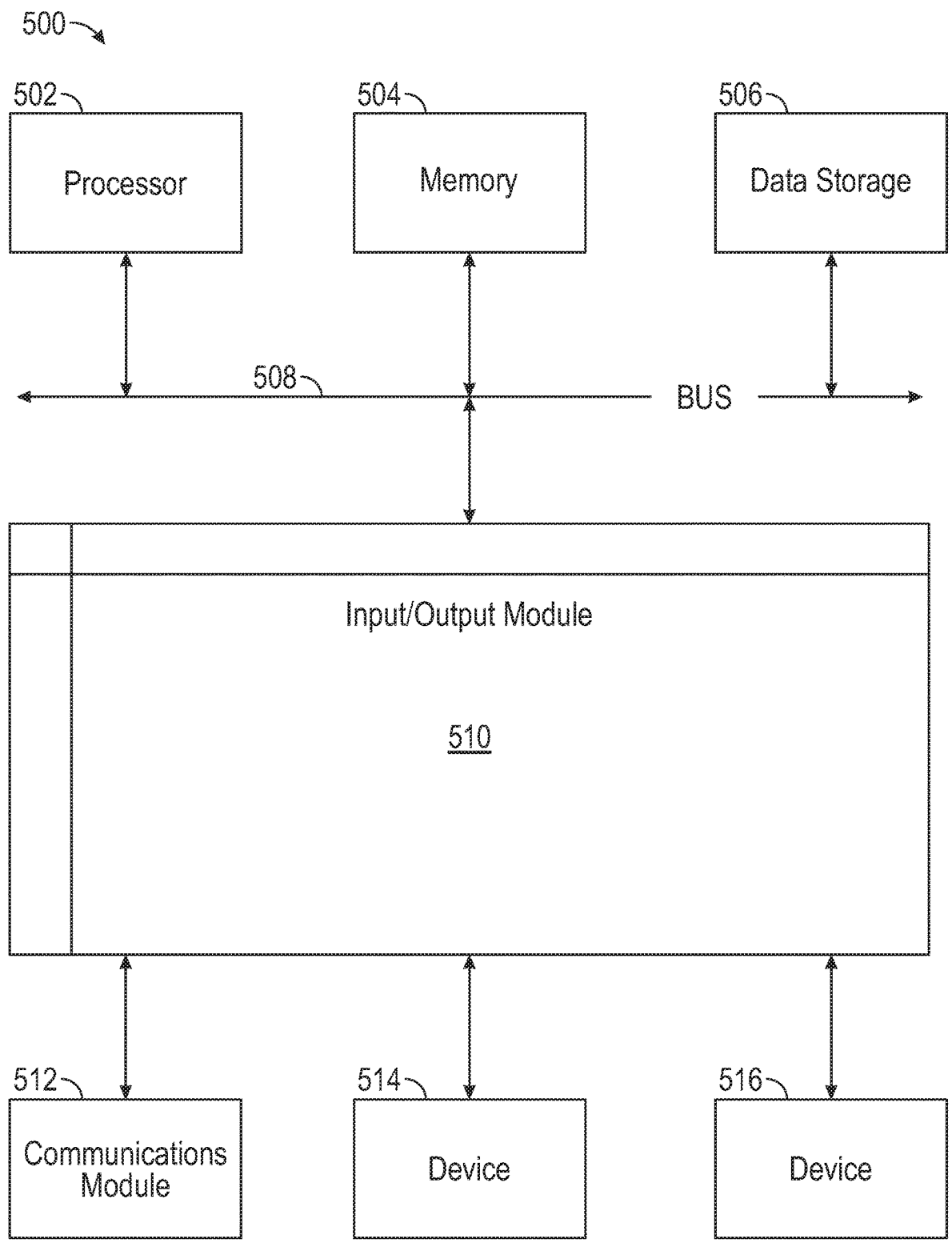
FIG. 5 is a block diagram illustrating an example computer system with which the branch controller, the VPNCs, the application monitor of FIG. 1 and the method of FIGS. 3 and 4 can be implemented.

FIG. 5 is a block diagram illustrating an example computer system 500 with which the branch controller 107, the VPNC 112A, 112B, the application monitor 110 of FIG. 1 and the method of FIGS. 3 and 4 can be implemented. In certain aspects, the computer system 500 may be implemented using hardware or a combination of software and hardware, either in a dedicated network device, or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. Input/output module 510 can be any input/output module. Exemplary input/output modules 510 include data ports such as USB hubs, PCI hubs, etc. The input/output module 510 is configured to connect to a communications module 512. Exemplary communications modules 512 include networking interface cards, such as Ethernet cards and modems. In certain aspects, input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, branch controller 107, the VPNC 112A, 112B, the application monitor 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and network devices. A client and network device are generally remote from each other and typically interact through a communication network. The relationship of client and network device arises by virtue of computer programs running on the respective computers and having a client-network device relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
    requesting, using a branch controller, an operating status of at least one application of a first plurality of applications executing in a first core site using a first User Datagram Protocol (UDP) ping, the first UDP ping being transmitted to a first network controller included in the first core site through a first VPN connection between the branch controller and the first core site;
    receiving, using the branch controller, the operating status of the at least one application of the first plurality of applications using the first UDP ping received through the first VPN connection;
    requesting, using the branch controller, an operating status of at least one application of a second plurality of applications executing in a second core site using a second UDP ping, the second UDP ping being transmitted to a second network controller included in the second core site through a second VPN connection between the branch controller and the second core site;
    receiving, using the branch controller, the operating status of the at least one application of the second plurality of applications using the second UDP ping received through the second VPN connection; and
    determining whether to switch access from the at least one application of the first plurality of applications to the at least one application of the second plurality of applications based on the received operating statuses using the branch controller, wherein the branch controller and the first and second core sites comprise a Wide Area Network (WAN).

2. The computer-implemented method of claim 1, wherein the first network controller includes a first Virtual Private Network controller, and the second network controller includes a second Virtual Private Network controller.

3. The computer-implemented method of claim 1, further comprises:
    requesting the operating status of the at least one application of the first plurality of applications executing in the first core site via a first application status request included in the first UDP ping, the first application status request being related to the at least one application of the first plurality of applications; and requesting the operating status of the at least one application of the second plurality of applications executing in the second core site via a second application status request included in the second UDP ping, the second application status request being related to the at least one application of the second plurality of applications.

4. The computer-implemented method of claim 1, further comprises:
receiving the operating status of the at least one application of the first plurality of applications via a first application status response included in the first UDP ping, the first application status response being related to the at least one application of the first plurality of applications; and
receiving the operating status of the at least one application of the second plurality of applications via a second application status response included in the second UDP ping, the second application status response being related to the at least one application of the second plurality of applications.

5. The computer-implemented method of claim 1, wherein the at least one application of the first plurality of applications and the at least one application of the second plurality of applications are same.

6. The computer-implemented method of claim 1, wherein the operating status of the at least one application of the first plurality of applications and the operating status of the at least one application of the second plurality of applications is requested at predetermined intervals.

7. A computer-implemented method comprising:
receiving, using a first network controller included in a first core site, a first User Datagram Protocol (UDP) ping through a first Virtual Private Network (VPN) connection between a branch site and the first core site, the first UDP ping requesting an operating status of at least one application of a first plurality of applications executing in the first core site;
transmitting, using the first network controller, the operating status of the at least one application of the first plurality of applications to the branch site using the first UDP ping and through the first VPN connection;
receiving, using a second network controller included in a second core site, a second UDP ping through a second VPN connection between a branch site and the second core site, the second UDP ping requesting an operating status of at least one application of a second plurality of applications executing in the second core site; and
transmitting, using the second network controller, the operating status of the at least one application of the second plurality of applications to the branch site using the second UDP ping and through the second VPN connection.

8. A computer-implemented method of claim 7, further comprising:
obtaining, using the first network controller, the operating status of the at least one application of the first plurality of applications using an application monitor; and
transmitting, using the first network controller, the operating status of the at least one application of the first plurality of applications to the branch site via an application status response included in the first UDP ping, the application status response being related to the at least one application of the first plurality of applications.

9. The computer-implemented method of claim 7, further comprises:
obtaining, using the second network controller, the operating status of the at least one application of the second plurality of applications using an application monitor; and
transmitting, using the second network controller, the operating status of the at least one application of the second plurality of applications to the branch site via an application status response included in the second UDP ping, the application status response being related to the at least one application of the second plurality of applications.

10. The computer-implemented method of claim 7, wherein the branch site includes a branch controller, the first network controller includes a first Virtual Private Network controller, and the second network controller includes a second Virtual Private Network controller.

11. The computer-implemented method of claim 7, wherein the branch site and the first and second core sites comprise a Wide Area Network (WAN).

12. The computer-implemented method of claim 7, wherein the operating status of the at least one application of the first plurality of applications and the operating status of the at least one application of the second plurality of applications is requested at predetermined intervals.

13. A system, comprising
a first virtual private network concentrator (VPNC);
a second VPNC; and
a branch controller to:
request an operating status of at least one application of a first plurality of applications executing in a first core site using a first UDP ping, the first UDP ping being transmitted to the first VPNC included in the first core site through a first VPN connection between the branch controller and the first core site;
receive the operating status of the at least one application of the first plurality of applications using the first UDP ping received through the first VPN connection;
request an operating status of at least one application of a second plurality of applications executing in a second core site using a second UDP ping, the second UDP ping being transmitted to the second VPNC included in the second core site through a second VPN connection between the branch controller and the second core site;
receive the operating status of the at least one application of the second plurality of applications using the second UDP ping received through the second VPN connection; and
determine whether to switch access from the at least one application of the first plurality of applications to the at least one application of the second plurality of applications based on the received operating statuses.

14. The system of claim 13, wherein the branch controller,
requests the operating status of the at least one application of the first plurality of applications executing in the first core site via a first application status request included in the first UDP ping, the first application status request being related to the at least one application of the first plurality of applications; and
requests the operating status of the at least one application of the second plurality of applications executing in the second core site via a second application status request included in the second UDP ping, the second application status request being related to the at least one application of the second plurality of applications.

15. The system of claim 13, wherein the branch controller,
- receives the operating status of the at least one application of the first plurality of applications via a first application status response included in the first UDP ping, the first application status response being related to the at least one application of the first plurality of applications; and
- receives the operating status of the at least one application of the second plurality of applications via a second application status response included in the second UDP ping, the second application status response being related to the at least one application of the second plurality of applications.

16. The system of claim 13, wherein the first VPNC,
- obtains, using the first VPNC, the operating status of the at least one application of the first plurality of applications using an application monitor; and
- transmits, using the first VPNC, the operating status of the at least one application of the first plurality of applications to the branch controller via an application status response included in the first UDP ping, the application status response being related to the at least one application of the first plurality of applications.

17. The system of claim 13, wherein the second VPNC,
- obtains, using the second VPNC, the operating status of the at least one application of the second plurality of applications using an application monitor; and
- transmits, using the second VPNC, the operating status of the at least one application of the second plurality of applications to the branch controller via an application status response included in the second UDP ping, the application status response being related to the at least one application of the second plurality of applications.

18. The system of claim 13, wherein the branch controller and the first and second core sites comprise a Wide Area Network (WAN).

19. The system of claim 13, wherein the at least one application of the first plurality of applications and the at least one application of the second plurality of applications are same.

* * * * *